- 
United States Patent Office 2,909,558
Patented Oct. 20, 1959

---

2,909,558

PHOSPHONOFORMAMIDES AND METHODS FOR PREPARATION

Theodor Reetz, Webster Groves, Mo., assignor to Monsanto Chemical Company, St. Louis, Mo., a corporation of Delaware No Drawing. Application May 27, 1957
Serial No. 661,625

6 Claims. (Cl. 260—461)

This invention relates to novel compounds and to a process for their preparation. More particularly, the invention relates to esters of phosphonoformamide and to a novel procedure for the preparation.

There are some esters of phosphonoformamide which are known to the prior art, for example the compounds having the structure

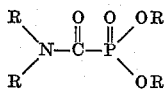

wherein the various groups are alkly radicals.

Several methods for preparing these compounds are described in the technical literature, but none of these methods resemble the novel procedure herein described. It is significant that known compounds of the above described type cannot be prepared by the claimed procedure and furthermore are not useful in the hereinafter described manner of the novel compounds. The applicant's procedure involves the reaction between alkyl isocyanates and the dialkyl phosphites in accordance with the following equation:

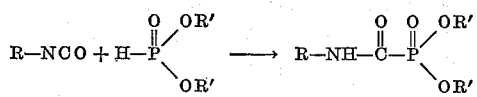

wherein all R and R' radicals are alkyl radicals, for example those having up to 20 carbon atoms.

The novel compositions are prepared by the interreaction of the alkyl isocyanate, such as methyl isocyanate, ethyl isocyanate, n-butyl isocyanate, isopropyl isocyanate, the amyl isocyanates, the hexyl and pentyl isocyanates and the octyl isocyanates including 2-ethylhexyl isocyanate, the decyl, tetradecyl and octadecyl isocyanates. Isocyanates having alkyl radicals of longer chain length may also be used in the practice of the new invention.

In accordance with the novel procedure the dialkyl esters of phosphonic acid, such as the diethyl phosphonate, the dimethyl phosphonate, the di-n-propyl phosphonate, the various dibutyl phosphonates, including n-butyl, isobutyl and tertiary dibutyl phosphonates, the diamyl, dipentyl, dioctyl and higher esters of phosphonic acid, which are frequently named dialkyl phosphites, are reacted with the said isocyanates.

The novel reaction comprises mixing the reactants and heating, if desired in the presence of a suitable inert solvent for the maintenance of the reflux temperature at the desired level. The preferred procedure involves the heating of the reaction mixture at the reflux temperature for a period of time sufficient to effect the combination of the isocyanate with the phosphonate (phosphite) to effect a bond between the carbonyl carbon and the phosphorus atom. The optimum reaction period may vary considerably from a few minutes to several hours depending upon the temperature of reaction and the presence or absence of the inert diluent. The new compounds are quite stable at moderately elevated temperatures and may be distilled at reduced pressures.

Although the compounds are relatively stable, the reaction by which they are prepared is reversible and at high temperatures they can be decomposed to form the initial reactants. This is a quite useful property, since it provides a useful means of stabilizing the very reactive isocyanates, which have experienced an increased usefulness and scope of application. It is possible by stabilizing the isocyanates in accordance with this invention to prevent premature or too rapid rates of reaction. The modified isocyanates are incorporated into the reaction mixture or product and by increasing the temperature the isocyanates are regenerated in situ. It is possible to gradually release the reactive isocyanate over an extensive period of time if desired.

Further details of this invention are set forth with respect to the following examples:

Example 1

A solution of 22.8 grams (0.4 mol) of methyl isocyanate in 55.0 grams (0.4 mol) of diethyl phosphite is heated under reflux for 26 hours, during which time the reaction temperature rises from about 70° C. to about 140° C. At the end of the reaction, the reaction mixture is distilled under reduced pressure and a fraction boiling at 107° C. at 0.5 mm. Hg is collected. On analysis, this product is found to be diethyl N-methylphosphonoformamide having a phosphorus content of 14.78% as compared to the calculated theoretical value of 15.9%.

Example 2

The procedure described in Example 1 is repeated using ethyl isocyanate in place of the methyl isocyanate. The reaction is conducted at reflux temperatures for 24 hours and then distilled at 0.5 mm. total pressure at 104–105° C. The product recovered is identified as diethyl N-ethylphosphonoformamide.

Example 3

The diethyl N(n-butyl) phosphonoformamide is prepared from the corresponding butyl isocyanate and diethyl phosphite, heating at reflux temperature for several hours produces the desired product which is separated from the reaction mixture by vacuum distillation.

Example 4

By using isoamyl isocyanate and the di(2-ethylhexyl) phosphite a substantial yield of di(2-ethylhexyl) N-isoamylphosphonoformamide is recovered.

What is claimed is:

1. The method of preparing dialkyl N-alkyl phosphonoformamide which comprises heating alkyl isocyanate with dialkyl phosphite until a substantial combination has occurred, and separating the resulting product.

2. The method of preparing diethyl N-ethyl phosphonoformamide which comprises heating ethyl isocyanate and diethyl phosphite at reflux temperatures until substantial reaction has occurred and thereafter separating the resulting ester of a formamide modified phosphonic acid by vacuum distillation.

3. The method of preparing dialkyl N-alkyl phosphonoformamide which comprises heating substantially equal molar proportions of alkyl isocyanate with dialkyl phosphite until a substantial combination has occurred, and separating the resulting product, said alkyl radical having up to eight carbon atoms.

4. The method of preparing diethyl N-ethyl phosphonoformamide which comprises heating substantially equal molar proportions of ethyl isocyanate and diethyl phosphite at reflux temperatures until substantial reaction has occurred and thereafter separating the resulting ester of a formamide modified phosphonic acid by vacuum distillation.

5. The compounds of the structure

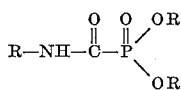

wherein the R groups are alkyl radicals.

6. The compounds of the structure

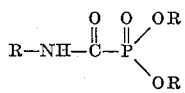

wherein the R groups are alkyl radicals having up to eight (8) carbon atoms.

References Cited in the file of this patent

Nylen, P.: "Berichte," vol. 57B, p. 1036 (1924).

Arbuzov et al.: "Izvest Akad Nauk S.S.R., Otdel Khim. Nauk," 847 (1952). (See Chem. Abst., vol. 47, p. 10457 (1953).)